United States Patent [19]

Gilbert

[11] Patent Number: 5,467,263
[45] Date of Patent: Nov. 14, 1995

[54] PROCESS FOR DESIGNATING A DISTANT FUNCTIONAL OBJECT IN A CIRCUIT, AND FUNCTIONAL UNITS AND INSTALLATION PERTAINING THERETO

[75] Inventor: Jérôme Gilbert, Levallois Perret, France

[73] Assignee: EURO CP s.a.r.l., L'Hay les Roses, France

[21] Appl. No.: 70,605

[22] Filed: Jun. 4, 1993

[30] Foreign Application Priority Data

Jun. 10, 1992 [EP] European Pat. Off. .............. 92401606

[51] Int. Cl.⁶ .................................................. G06F 15/46
[52] U.S. Cl. ..................... 364/140; 364/141; 340/825.07; 340/825.22
[58] Field of Search ............................ 364/140, 141–146; 340/825.06–825.08, 310 CP, 310 A, 310 R, 825.2, 825.21, 825.22; 307/11, 38–41

[56] References Cited

U.S. PATENT DOCUMENTS

| | | | |
|---|---|---|---|
| 4,217,646 | 8/1980 | Caltagirone et al. | 364/493 |
| 4,418,333 | 11/1983 | Schwarzbach et al. | 340/310 A |
| 4,567,557 | 1/1986 | Burns | 364/145 |
| 4,656,393 | 4/1987 | Amboss | 315/5.38 |
| 4,703,306 | 10/1987 | Barritt | 340/310 CP |
| 4,763,164 | 8/1988 | Ariga et al. | 355/14 R |
| 4,847,781 | 5/1989 | Brown, III et al. | 364/492 |
| 4,910,658 | 3/1990 | Dudash et al. . | |
| 4,939,728 | 7/1990 | Markkula et al. | 370/94.3 |

FOREIGN PATENT DOCUMENTS

| | | |
|---|---|---|
| 0203668 | 12/1986 | European Pat. Off. . |
| 0315158 | 5/1989 | European Pat. Off. . |
| 2337478 | 7/1977 | France . |
| 2128367 | 4/1984 | United Kingdom . |
| WO89/04578 | 5/1989 | WIPO . |
| WO90/07239 | 6/1990 | WIPO . |

OTHER PUBLICATIONS

"Introduction to Names, Addresses and Routes in an OSI Environment", *Computer Communications*, vol. 13, No. 1, Jan./Feb. 1990, By A. Patel et al., pp. 27–36.

*Primary Examiner*—Roy N. Envall, Jr.
*Assistant Examiner*—Thomas E. Brown
*Attorney, Agent, or Firm*—Young & Thompson

[57] ABSTRACT

At one stage of an organization process for a home network, an electrical equipment waits for the designation of another remote electrical equipment in the same network. The waiting equipment transmits a designation request via the network. The electrical equipments affected by the request make their presence known, to an operator, in particular by flashing their indicator lamps. The operator designates one of the equipments by acting on any control of this object. The designated equipment transmits an answer message, which is accepted by the equipment initiating the designation request. The actions on the part of the operator create and organize a home network which is user friendly and simple to set up.

16 Claims, 3 Drawing Sheets

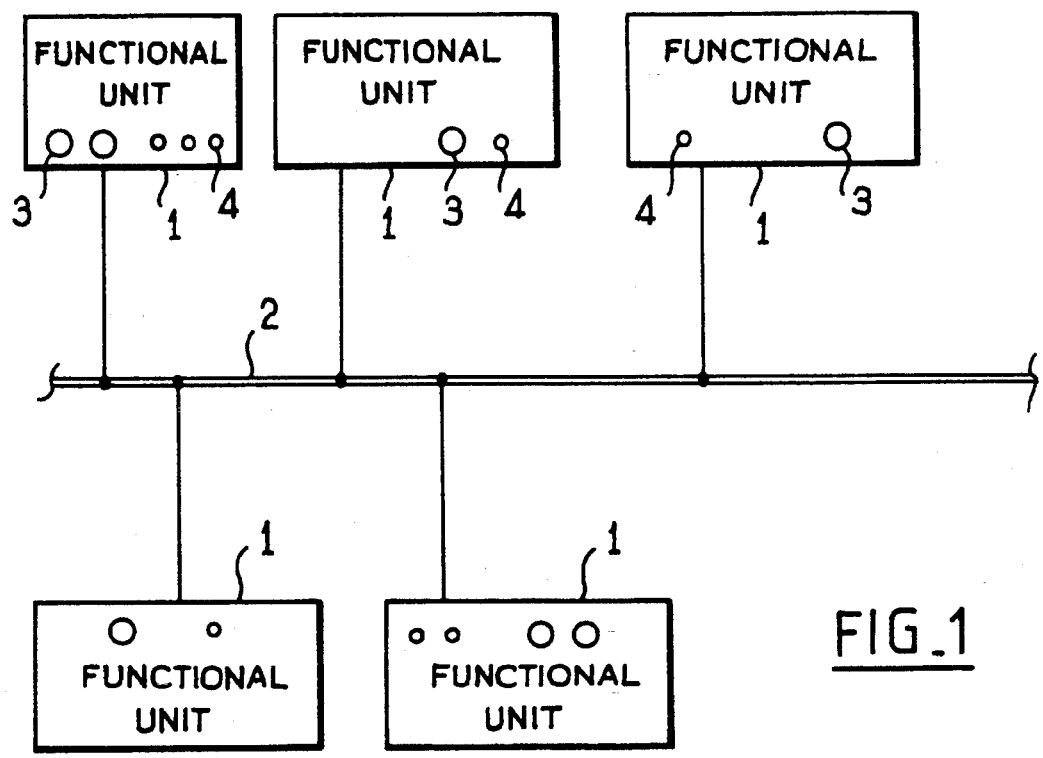
FIG_1
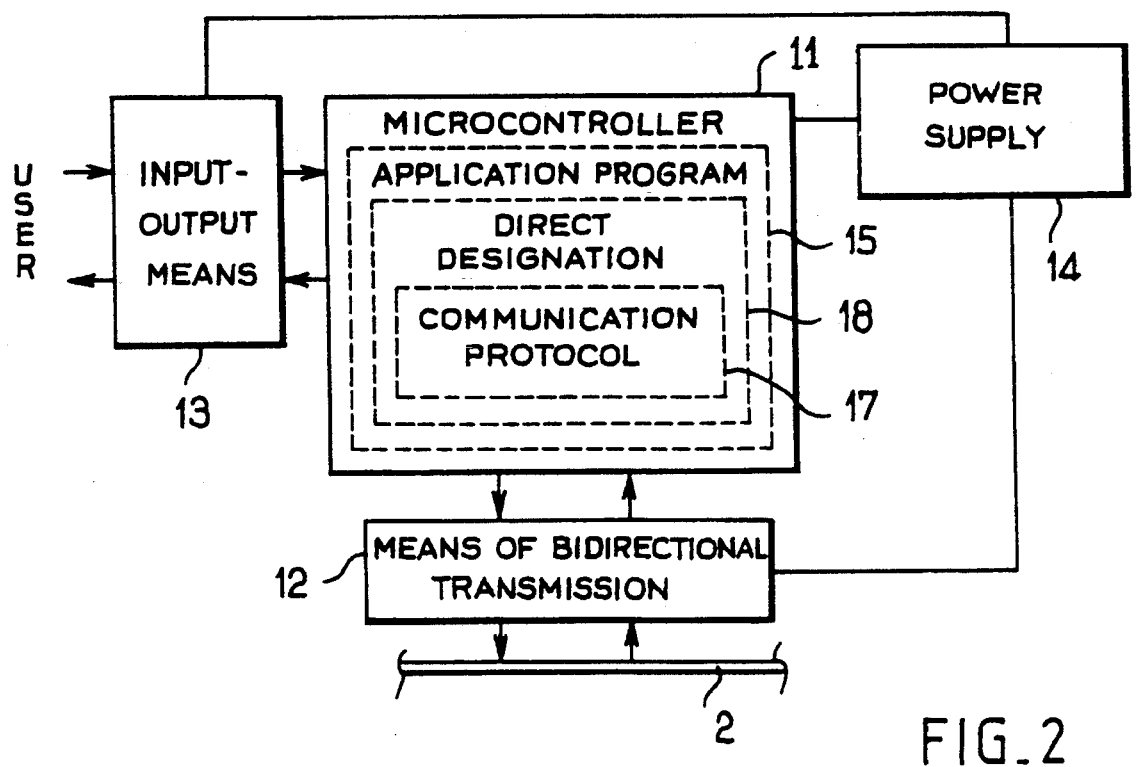
FIG_2

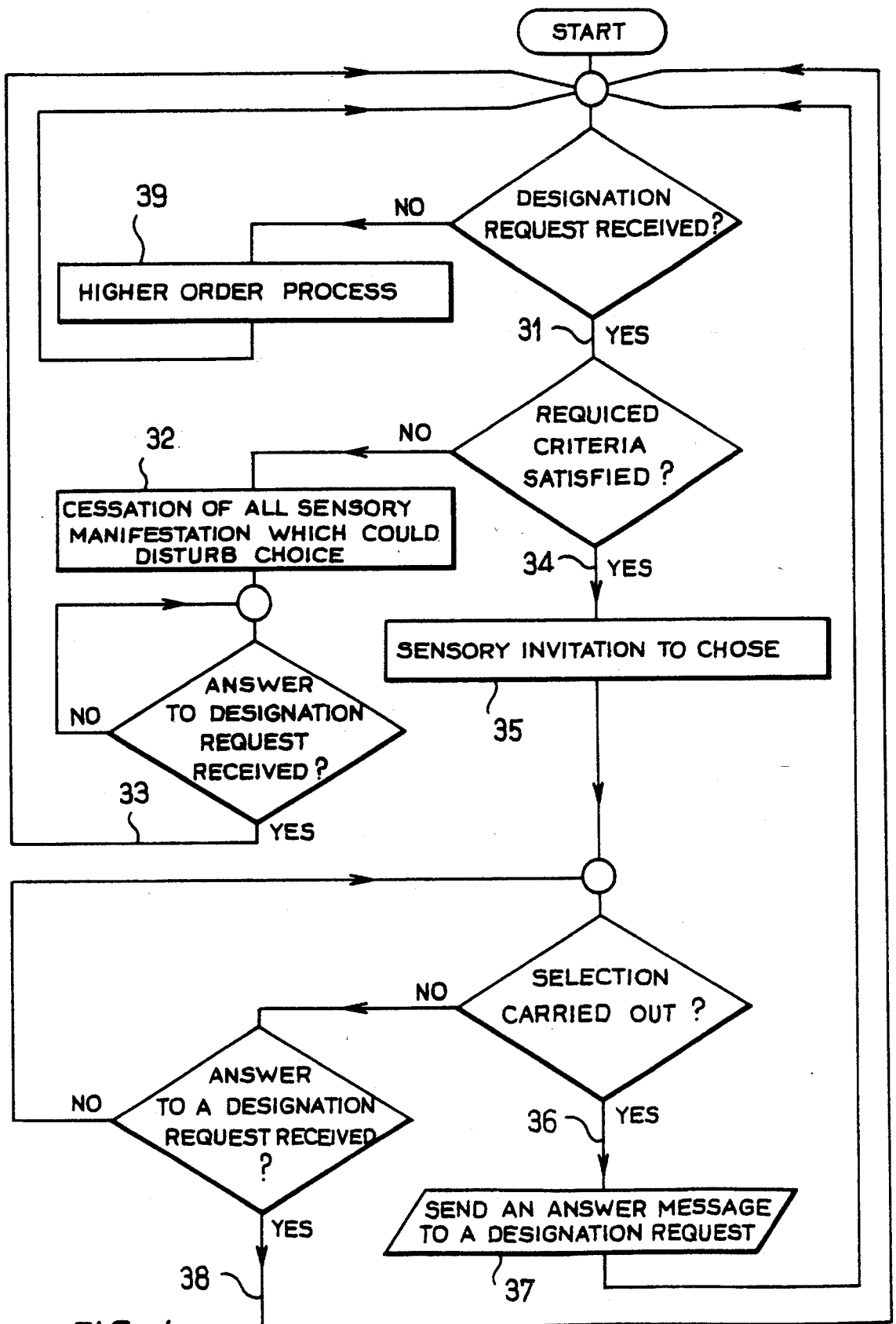
FIG_4

PROCESS FOR DESIGNATING A DISTANT FUNCTIONAL OBJECT IN A CIRCUIT, AND FUNCTIONAL UNITS AND INSTALLATION PERTAINING THERETO

BACKGROUND OF THE INVENTION

1. Field of the Invention

The present invention relates to a process for designating a remote functional object in a bidirectional communication network connecting together functional objects within a dwelling.

The present invention also relates to functional units and an installation for implementing this process.

The invention applies to home installations and to installations in trade premises.

2. Description of the Related Art

In such installations it is known how to organize functional objects by connecting them together via a communication network so as to afford the user control which is more advanced, more automated or more convenient.

The invention is implemented using functional objects, for example appliances which are capable of bidirectional communication. The transmission medium or media used to create the bidirectional communication network can be carrier currents, a cable, fiber optic or radio-frequency means, etc.

The remote functional objects need not only be appliances, but can also be functions or facilities of the appliance, or also a unit providing a relay function for an appliance at a distance from the dwelling.

In the description to follow, it is understood that the phrase "functional object" is taken to be synonymous with "electrical device" or "electrical equipment" or "electrical appliance", or any equivalent structure.

The structure of the most suitable network for implementing this process is a multi-master, multi-slave structure with possible role swapping. The method of accessing the transmission medium will be advantageously of a multiple access type with listening and collision management.

This type of installation involves operational phases where an operator or user must designate a functional object. For example, this is the case when the operator configures the installation: he must then designate the functional objects which have to communicate with each other, i.e. for example to indicate, in order that this is stored, which functional object will have to respond to a given command, for example that of a timer.

Traditional indirect designation is known, which is part of what is commonly called programming. This generally requires specific abilities and a technical bent.

SUMMARY OF THE INVENTION

The aim of the invention is to propose a designation process which is particularly simple to implement and requires virtually no memorization even for a user with little technical ability.

According to the invention, the process for designating a particular remote functional object in a bidirectional communication network connecting together functional objects in a dwelling, is characterized by the following steps:

- transmission of a designation request message via the network by a first functional object;
- reception of the designation request message by other functional objects in the network and production by them of a sensory stimulus (blinking light, buzzer, or the like) which is perceptible to an operator;
- direct physical action, by the operator, on a second functional object from those which produced the sensory stimulus;
- transmission by the second functional object of an answer message to the designation request, containing information relative to said second functional object;
- acceptance of the answer message, by the first functional object.

The user, receiving the sensory stimulus from the functional objects which area available for designation, has only to act physically on one of those for this action to cause the transmission by the designated object via the network, of a message which will be interpreted as a designation.

In this way the invention breaks totally with the logic of existing solutions by only requiring from the operator a few operations of childlike simplicity based on the physical designation of the functional object after having been requested to make a designation, by a sensory stimulus which attracts the attention of the operator.

The process according to the invention offers the operator satisfactory ergonomics while being implemented in a form which includes a program which is incorporated in inexpensive appliances. The minimal hardware for man-machine communication for implementing the invention is, for example, one or two push-buttons and an indicator lamp on each functional object. These buttons and indicator lamps need not be dedicated, as they may have other interface functions when object designation sessions are not in progress. These simple means are sufficient to guide the users and take into account their choices during all stages of the process.

In one particularly useful method for implementing the process, the answer message to the designation request contains a network address element, and acceptance of the answer message causes the first object to adopt the network address element as its own address.

In this way one can give as desired the same network address to a newly installed appliance as those with which it will have to communicate, without the user having to know this address. Then, at the time of operating the installation, the messages will contain the network address of the transmitting functional object and only those functional objects having the same network address will accept these messages. In this way two independent networks can be created in the same dwelling and disturbance of similar installations in the neighbourhood is avoided.

Also a subject of the invention is functional units adapted for implementing the process, and containing a microcontroller to which input/output means are connected and a means of bidirectional transmission to connect the microcontroller to a bidirectional communication network.

A functional unit consists of one functional object or a combination of several functional units which can be designated independently of one another.

A functional unit capable of calling a designation is characterized in that the microcontroller contains a designation program including steps of sending a designation request message, and waiting for an answer message containing information relative to a functional object and accepting this message.

A functional unit capable of being designated is characterized in that the microcontroller contains a program for receiving a designation request message, controlling production of a sensory, (blinking lights, buzzers, etc.) waiting for action by the an operator on the input/output means and, sending a message via the communication network if the operator performs such an action.

The functional units can be capable of both calling a designation and of receiving a designation request.

The invention also relates to an installation containing such functional units linked together by a bidirectional communication network.

BRIEF DESCRIPTION OF THE INVENTION

Other features and advantages of the invention will also be apparent from the following description, reference being made to the non-limitative examples.

In the attached diagrams:

FIG. 1 is a schematic view of an installation according to the invention;

FIG. 2 is a block diagram of a functional unit according to the invention;

FIG. 4 represents the stages in the process for functional units of the network with the exception of that which is the source of the direct designation request for a remote object.

DESCRIPTION OF THE PREFERRED EMBODIMENTS

Figure 3:
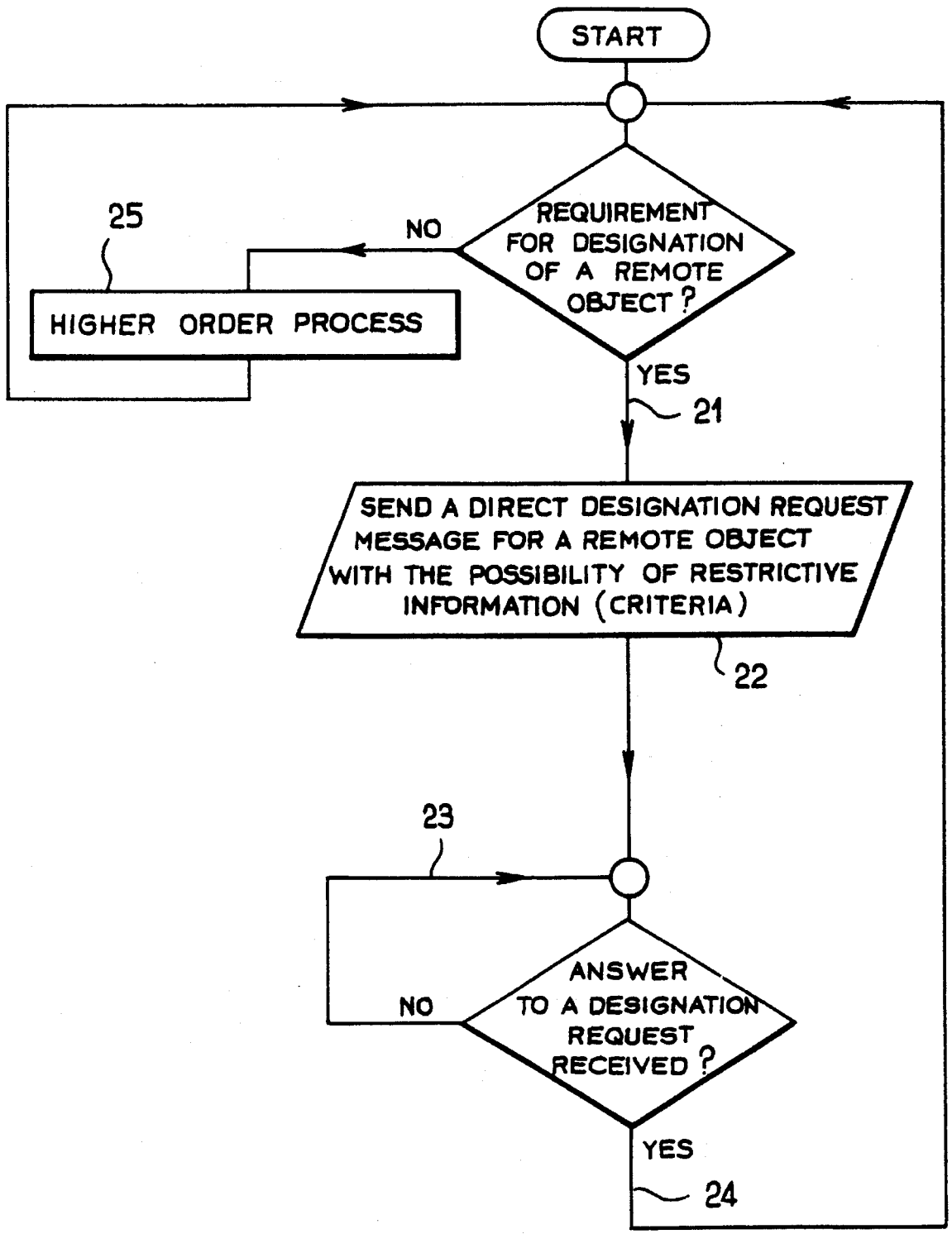
FIG. 3 represents the stages in the process for the functional unit of the network which is the source of the direct designation request for a remote object.

In the example shown in FIG. 1, the installation, which has been intentionally simplified, contains various functional units 1, for example household electrical appliances, connected to one another by a bidirectional communication network 2 via which they can exchange messages. The functional units 1 contain control or adjusting buttons 3 and indicator lamps or other indicators 4.

The network 2 may consist of the electricity mains circuit, in which case the messages are processed in a concrete fashion using carrier current techniques. The network 2 may also consist of a space which is permeable to radio waves or infrared signals.

As is shown in FIG. 2, each functional unit has a microcontroller 11 connected to the input/output means 13 which provide the interface with the user. In practice, these input/output means consist of buttons 3 and indicator lamps 4 of the functional unit, and also, when the unit is a working appliance such as a household electrical appliance, by the operating gear of the working appliance which supply the user with the expected action, for example lighting, heating, etc.

As a function of the commands issued by pressing the buttons 3 and, if appropriate, the signals received from sensors, an application program 15 stored in the microcontroller manages the action of the indicator lamps 4 and the operating gear (lamps, motors, heating resistors, relays etc.) being part of the input/output means 13. In addition the microcontroller 11 is connected to a power supply 14. The microcontroller 11 is also connected to the network 2 via a bidirectional transmission means 12, for example a modem capable of converting the information received from the microcontroller 11 into a message of carrier current type, and conversely of converting messages of carrier current type originating from the network 2 into signals which can be accepted by the microcontroller 11.

The microcontroller 11 also contains a protocol program 17 which manages the information exchanges between the microcontroller, the means of bidirectional transmission and the input/output means.

The process according to the invention can be integrated into a much larger process which will be called hereafter a "higher order process", and starts on the initiative of the higher order process of a functional unit when this process reaches a stage where there is a need for the user to designate a remote object.

The higher order process, which is materialized by the application program of this functional unit, can be a process for configuring the network, in which the user must match the functional objects, for example matching a remote control appliance with a working appliance. This is also the case when there is a need to indicate to a timer the functional objects on which the programming acts.

For a functional unit of which the higher order process initiates the start of a direct designation session for a remote object, the first step of the designation process according to the invention comprises a step 22 of sending from this functional unit, via the network, a message requesting direct designation, to the other units in the network; the direct designation request message may have other criteria added to it which serve to limit the choice to only those functional objects which are pertinent to the context in which the higher order process finds itself. The next step (23) involves waiting to receive an answer message to the direct designation request (22). When the latter is received (24), the direct designation session is terminated and the process according to the invention hands over control of the unit to the higher order process (25) which can thus pass on to a step which follows the designation. The answer message received in response to a direct designation request, of which at least one part is stored in memory by the higher order process, contains all the necessary information elements so that the higher order process may subsequently retrieve the object thus designated. Alternatively the designation process may include a storage stage before termination of the designation session.

For the functional units in the network other than that which started the session, the process according to the invention starts with stage 31 of receiving a direct designation request message.

These "other" functional units are themselves controlled by their own application program 15 materializing a higher order process which is in general different to that of the unit which requested designation. But each application program includes a "designation program" part, and the reception of a designation request message automatically causes each unit to come under the control of its designation program.

The next step involves comparing any choice restriction information which is found in the request message with the particular characteristics of the appliance.

The units whose characteristics do not correspond to the request omit or discontinue any sensory stimulus which could disturb the user's choice (32). Reception of an answer message to the direct designation request (33) discontinues the designation session within this unit and causes the unit to change back to the higher order process (39).

By means of appropriate sensory stimulus (35), such as for example flashing of the indicators, those units whose characteristics correspond to the criteria (34) invite the user to designate the object of his choice.

The unit chosen by the user (38) sends an answer message in response to the direct designation request (37). This message contains all the necessary information elements so that the unit having requested the designation may subsequently, in the higher order process, retrieve the object designated previously. After sending an answer message, the process according to the invention hands back control of the appliance to the higher order process (39). The designation session is thus terminated in this unit.

The process according to the invention, for the units which are not chosen, control of the operation of each of these units is handed back to the higher order process (39) immediately the answer message to the direct designation request is received (38).

For each unit in the network a time-out is started as soon as the unit is controlled by the process according to the invention. This timeout can be reset on completion of each stage of the process and its duration can be, for example, of the order of 5 to 10 minutes. Any inactivity on the part of the user lasting longer than that of the time-out leads to the sending of an end of session message which causes the direct designation of a remote object session to be aborted and control of each unit in the network to be handed back to the higher order process. This time-out prevents the system from being tied up by opening a direct designation session which is not completed.

After the designation session, but while the higher order process is still running in the unit which initiated the designation session, the other units units come under the control of a higher order process which is different from that which controls the unit which requested the designation. For example, this different higher order process can be the normal operating process of the unit, for example, heat production if the unit is a heating appliance.

The functional units may be of three kinds. The first kind is capable of transmitting a designation request and is incapable of reacting to a designation request originating from another unit. In this case, their direct designation program 15 in FIG. 2 corresponds to the flow chart in FIG. 3. This kind of functional unit can include a specific command for starting the higher order process which may lead to designation requests. In practice, this kind of functional unit can be in the form of a remote control unit or also a programming device. But it is also conceivable that this first kind of unit automatically starts the higher order process which will lead to a designation request. In this case, no other specific manual command is necessary. For example, this is the case of an electrical power load-shedding device which, when a period of expensive energy approaches, automatically requests designation of those consuming functional units which will have to be automatically shut down when the tariff changes.

The second kind is simply capable of receiving a designation request message, without being able to transmit. This can be the case for a household electrical appliance, which can then be presented to the user in an entirely conventional fashion, without any controls or signalling means specific to the process of the invention. For example, normally, the input/output via means 13, in particular the orders received by the manual controls 3 and the indications provided by the indicator lamps 4 and other indicators, are managed by the application program 15 of the microcontroller, constituting the higher order process. If a designation request message is received, the unit comes under the management of the designation program, which changes the function of the manual controls 3 and the indicators 4. Sensory stimulus is for example produced by the flashing of all the indicators, and the user can designate the unit by actuating any of the manual controls 3 connected to the microcontroller. Alternatively, in a unit containing two different functional objects, for example a freezer and a refrigerator, it is possible to restrict the choice to one of the objects by causing only the indicators which are specific to this object to flash and, if two objects are offered to the user to chose from, it is possible to allow the user to specifically designate one of the two objects and not the other by actuating a control of the object he wishes to designate. The answer message in response to the designation request then contains an element identifying the object designated from the two objects of the unit. Once the session is terminated, the controls 3, the lamps 4 and the other indicators of the functional unit which have received the designation request message resume their normal function.

The third kind of functional unit is capable of both transmitting designation request messages and receiving them. The designation program of these units includes a section according to the flow chart in FIG. 3 and another section according to the flow chart in FIG. 4.

After operating the installation, the designation which was carried out in the way which was described in detail earlier, will have a significance which is defined by the higher order process which manages the unit which initiated the designation request, at a time it initiated it: for example the designated unit will henceforth be known to the higher order process as having to receive, via the network, a switch-on order when a predetermined control is actuated or a predetermined event occurs in another functional unit in the network, for example that which initiated the request.

Another method for implementing the invention is applicable for allocating a network address to a functional object, i.e. a type of password identical for all the functional objects that one wishes to make communicate with each other in the network. Each message exchanged will contain the network address and only those objects having the same network address will accept the message. In this way disturbance of neighbouring networks is avoided, and one has the possibility of creating two or more independent networks in the same dwelling.

The means and procedures for allocating a network address to a first object will not be explained here. This is possible by memory loading, among other procedures. It is assumed that at least one object already has a network address and the procedure for giving the same network address to a second object which one wishes to communicate with the first will be described. When the second object, which does not have a network address is connected to the network, or when it is put into operation by the on/off button, or also when a specific button is pressed, or finally when any button of the appliance is pressed, the second object transmits a designation request message which is called a network address request. All the functional objects connected via the communication space (for example the electricity distribution system of the dwelling) and which already have a network address emit a sensory stimulus. The user designates a functional object with which he wishes the newly installed object to communicate. The designated functional object transmits an answer message containing notably its network address. The newly installed object takes account of the answer message by adopting the network address of the designated object as its own address.

If the network address search session was initiated by pressing on any button of the appliance, this button reverts to its normal working function of the appliance when the network address is acquired or later when the other stages of the higher process for matching have been carried out.

The invention is not limited to the examples described and represented.

It is conceivable that the objects receiving the designation requests remain under the control of a specific program while the object which initiated the designation request is itself controlled by a specific higher order process, such as a configuration process, necessitating a specific dialogue with the other objects in the installation.

I claim:

1. Process for selecting at least one electrical equipment among a plurality of electrical equipments interconnected through a bidirectional communication network, said process comprising the steps of:

transmitting a designation request via the communication network, from any one of said plurality of electrical equipments which requests said designation;

receiving said designation request message by other electrical equipments;

producing a sensory stimulus perceptible to an operator, by at least one of said electrical equipments;

successively performing a physical action on at least one electrical equipment chosen by an operator among those electrical equipments producing a sensory stimulus;

transmitting, in response to said physical action, via said communication network, by each electrical equipment submitted to said physical action, an answer message to said designation request, said answer message containing information relative to said transmitting electrical equipment; and receiving and accepting said answer message, by said requesting equipment.

2. Process according to claim 1, wherein said designation request message comprises choice restriction information which limits a number of other electrical equipments which produce a sensory stimulus as a result of receiving said designation request message.

3. Process according to claim 2, wherein at least one of said electrical equipments receiving said designation request message compares said choice restriction information with data specific to said other electrical equipments and neglects to produce a sensory stimulus if said comparison reveals that said at least one electrical equipment is not affected by said designation request message.

4. Process according to claim 3, wherein said other electrical equipments which neglect to produce said sensory stimulus further carry out the steps of:

changing over to a designation session upon reception of said designation request message;

waiting for a reception of said answer message in response to said designation request to leave said designation session.

5. Process according to claim 1, wherein said reception of said designation request message by said other electrical equipments causes said other electrical equipments to change over to a designation session controlled by a designation program.

6. Process according to claim 1, wherein reception by said requesting equipment of an answer message in response to said designation request terminates said designation session.

7. Process according to claim 6, wherein said termination of said designation session automatically causes said requesting equipment to change over to a next phase of a higher order process.

8. Process according to claim 7, wherein changing over to said next phase modifies a function of at least one interface means of said requesting equipment with the operator.

9. Process according to claim 1, wherein said designation request message temporarily modifies a function of at least one interface means of said electrical equipment with an operator, so that said interface means, which usually indicates a function of the electrical equipment, now produces said sensory stimulus after reception of said designation request message.

10. Process according to claim 1, wherein a time-out is initiated at a start of said process, said time-out being reset with each action by the operator, and said designation session being terminated if said time-out elapses.

11. Process according to claim 1, wherein said operator, for said direct physical action, actuates a control of said electrical equipment, said control actuation causing, whatever the actuated control, the transmission of an answer message in response to said designation request, a content of said answer message being similar regardless of the actuated control.

12. Process according to claim 1, wherein said answer message to said designation request comprises a network address element, and said acceptance of said answer message causes said requesting equipment to adopt said network address as its own address within said network.

13. Electrical equipment comprising a microcontroller connected to input/output means and a bidirectional transmission means in order to connect said microcontroller to a bidirectional communication network, means for designating an electrical equipment within said network comprising means for transmitting a designation request message, means for waiting for an answer message containing information relative to an electrical equipment, means for accepting said answer message, said designation means further comprising means for receiving a designation request, means for controlling a production of a sensory stimulus, means for waiting for a physical action by an operator on said input/output means, and, means for sending a message via said communication network in the event of said action by said operator.

14. Electrical equipment according to claim 13, wherein said means for producing said sensory stimulus by at least one input/output means is controlled, outside of said designation sessions, by an application program for indicating a particular function of said electrical equipment.

15. Electrical equipment according to claim 14, wherein when said operator action waiting means detect an operator action on the input/output means outside of an electrical equipment designation session, said operator action triggering said application program which controls a particular function of said electrical equipment.

16. Electrical equipment according to claim 14, wherein said operator action on said input/output means is equally effective as an action on any one of a plurality of input/output means, the actuating of said input/output means outside of an electrical equipment designation session being detected by said application program to further control various particular functions of said electrical equipment.

\* \* \* \* \*